(12) United States Patent
Archer et al.

(10) Patent No.: US 8,201,656 B2
(45) Date of Patent: Jun. 19, 2012

(54) VEHICLE STEERING SYSTEM

(75) Inventors: David W. Archer, Hortonville, WI (US); Nicholas J. Zepnick, Green Bay, WI (US)

(73) Assignee: Oshkosh Corporation, Oshkosh, WI (US)

( * ) Notice: Subject to any disclaimer, the term of this patent is extended or adjusted under 35 U.S.C. 154(b) by 5 days.

(21) Appl. No.: 12/681,472

(22) PCT Filed: Oct. 3, 2008

(86) PCT No.: PCT/US2008/078669
§ 371 (c)(1),
(2), (4) Date: Jul. 26, 2010

(87) PCT Pub. No.: WO2009/046246
PCT Pub. Date: Apr. 9, 2009

(65) Prior Publication Data
US 2010/0289238 A1   Nov. 18, 2010

Related U.S. Application Data

(60) Provisional application No. 60/997,636, filed on Oct. 4, 2007.

(51) Int. Cl.
*B62D 5/06* (2006.01)

(52) U.S. Cl. ........ 180/428; 180/417; 180/420; 180/421; 180/439; 280/93.514; 280/93.515

(58) Field of Classification Search ............... 180/400, 180/408, 412, 413, 414, 415, 417, 421, 422, 180/426, 427, 428, 431, 433, 434, 437, 439, 180/443, 444, 446; 280/93.514, 93.515
See application file for complete search history.

(56) References Cited

U.S. PATENT DOCUMENTS

| | | | | |
|---|---|---|---|---|
| 3,944,015 A | * | 3/1976 | Bishop | 180/428 |
| 4,651,843 A | * | 3/1987 | Estela Rosell | 180/433 |
| 4,981,189 A | * | 1/1991 | Wilder | 180/428 |
| 5,327,986 A | * | 7/1994 | Saita | 180/446 |
| 5,372,214 A | | 12/1994 | Haga et al. | |
| 6,510,917 B2 | * | 1/2003 | Cole | 180/437 |
| 7,331,419 B2 | * | 2/2008 | Sikora et al. | 180/439 |
| 7,441,475 B2 | * | 10/2008 | Eberhart et al. | 74/388 PS |

(Continued)

FOREIGN PATENT DOCUMENTS

EP   1 808 355   7/2007

(Continued)

OTHER PUBLICATIONS

European Search Report for European Application No. 08835822.1, mail date Oct. 11, 2011, 5 pages.

(Continued)

*Primary Examiner* — Tony H. Winner
*Assistant Examiner* — Marc Scharich
(74) *Attorney, Agent, or Firm* — Foley & Lardner LLP

(57) ABSTRACT

A vehicle steering system includes a gear rack supported in a fixed position, a pinion gear in meshing engagement with the gear rack, a steering subsystem supporting the pinion gear and moveable in a translational manner relative to the gear rack and at least one steering arm coupled to steering subsystem and configured to steer a motive member in response to movement of the steering subsystem. The vehicle steering system is configured to remain substantially within a framework of the vehicle while steering one or more motive members of the vehicle.

19 Claims, 8 Drawing Sheets

U.S. PATENT DOCUMENTS

| | | | |
|---|---|---|---|
| 2003/0006086 A1* | 1/2003 | Ballester | 180/400 |
| 2004/0040779 A1 | 3/2004 | Bishop et al. | |
| 2005/0103559 A1 | 5/2005 | Sikora et al. | |
| 2006/0043690 A1 | 3/2006 | Pankau | |
| 2006/0272883 A1* | 12/2006 | Shin et al. | 180/428 |

FOREIGN PATENT DOCUMENTS

| | | |
|---|---|---|
| KR | 10-1993-0019498 A | 10/1993 |
| KR | 10-2003-0051769 A | 6/2003 |
| KR | 10-2006-0030260 A | 4/2006 |
| WO | WO 03/053765 | 7/2003 |

OTHER PUBLICATIONS

PCT International Search Report and Written Opinion for PCT/US2008/078669, dated Dec. 16, 2008 (6 pgs.).

* cited by examiner

VEHICLE STEERING SYSTEM

CROSS REFERENCE TO RELATED PATENT APPLICATIONS

The present application claims the benefit under 35 U.S.C. §119(e) of U.S. Provisional Application No. 60/997,636, having a filing date of Oct. 4, 2007, titled "Vehicle Steering System," the complete disclosure of which is hereby incorporated by reference.

BACKGROUND

The present disclosure relates to vehicle steering systems. In particular, the present disclosure relates to rack and pinion type steering mechanisms used for controlling the steering of motive members (e.g., wheels, etc.). The present disclosure also relates to vehicles having steerable front and/or rear motive members or wheels that incorporate such steering mechanisms.

It would be desirable to provide a vehicle steering system utilizing rack and pinion technology for which the components of the system are configured to remain substantially within the periphery of a vehicle body while steering the vehicle. Such a system would provide an improved vehicle steering system that is less susceptible to failure in the event that the vehicle is exposed to an obstruction and/or a significant force originating outside of the vehicle (e.g., a roadside mine or other explosive device, a large rock, a pothole, etc.). However, the problems posed by this type of arrangement are particularly complicated because they exist within the complexity of an overall vehicle system. For example, the sizing constraints of vehicle body, the positioning of the vehicle transmission, engine and/or suspension systems within the vehicle, the requirement of the steering system to be adaptive to varying suspension systems, road conditions, loading conditions, engine and motor torque and speed characteristics, operator control, etc. Accordingly, the selection of a solution may result in unforeseen steering control complications, sizing complications, cost increases, manufacturing efficiency losses, expensive part configurations, performance and control losses, etc. Further complicating the use of this type of steering system is the need to use such systems in vehicles that are going to be exposed to extreme and/or hazardous environments.

SUMMARY

According to an exemplary embodiment, a vehicle steering system includes a gear rack supported in a fixed position, a pinion gear in meshing engagement with the gear rack, a steering subsystem supporting the pinion gear and moveable in a translational manner relative to the gear rack and at least one steering arm coupled to the steering subsystem and configured to steer a motive member in response to movement of the steering subsystem.

According to another exemplary embodiment, a vehicle includes a chassis including at least one motive member and a hull. The hull includes a first lateral side wall and a second lateral side wall. The vehicle further includes a vehicle steering system for steering the motive member. The vehicle steering system includes a steering subsystem including a housing and a member received by the housing and supporting a gear rack having a plurality of teeth. The member is secured in a fixed position relative to the chassis between the first and second lateral side walls. The vehicle steering system further includes a pinion supported by the housing and having a gear portion in meshing engagement with the teeth of the gear rack. The steering subsystem moves in a translatable manner relative to the member upon the rotation of the pinion.

According to another exemplary embodiment, a method of steering a vehicle includes the steps of providing a vehicle with a framework defined laterally by a first wall and a second wall, fixing a gear rack to the framework between the first wall and the second wall, supporting a pinion gear on a housing that is configured to move in a translatable manner relative to the gear rack and coupling a least one steering arm between the housing and the motive member so that the motive member is steered with the housing and moves relative to the gear rack.

DETAILED DESCRIPTION

Figure 1:
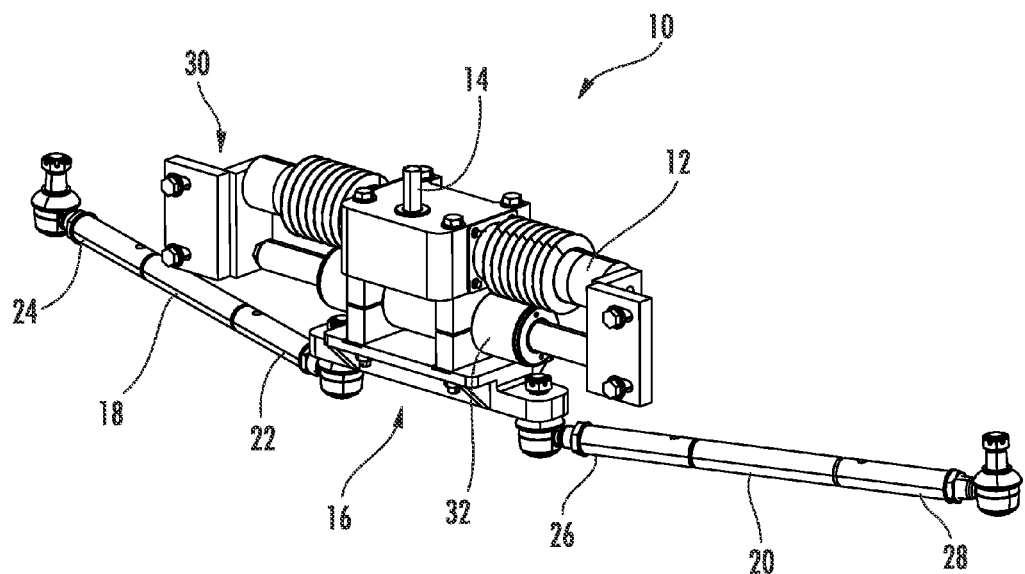
FIG. 1 is an isometric view of a vehicle steering system according to an exemplary embodiment.

Referring generally to the FIGURES, a vehicle steering system 10 and components thereof are shown according to exemplary embodiments. Vehicle steering system 10 is configured to transmit a steering command received from a steering input for steering one or more front and/or rear motive members of a vehicle. Vehicle steering system 10 is configured to remain substantially within the periphery (e.g., lateral boundary, etc.) of the framework (e.g., chassis, frame, body, etc.) of the vehicle while it steers the motive member through their full range of movement (e.g., between an extreme right-hand turn and an extreme left-hand turn, etc.). As such, vehicle steering system 10 may reduce the likelihood that the steering capabilities of a vehicle will become inoperable or otherwise damaged in the event that the vehicle is exposed to an external force (e.g., the force from an explosive device such as a roadside mine, etc.), obstructions (e.g., rocks, a fallen tree, uneven terrain, etc.), containments or any other external situation that may impair the functionality of the steering system.

To facilitate the transmission of a steering command to the one or more front and/or rear motive members of the vehicle, vehicle steering system 10 utilizes a rack and pinion mechanism. As detailed below, the rack portion of vehicle steering system 10 is held in a substantially fixed manner relative to the vehicle frame or chassis while the pinion portion (as part of a steering subsystem) is movable in a translatable manner relative to the rack portion. According to an exemplary embodiment, the rack portion is configured to extend laterally between opposing side walls of a vehicle and is configured to be mounted in a fixed manner relative thereto. One or more steering arms or links are intended to be coupled between the steering subsystem and one or more motive members of the vehicle to steer the motive members as the pinion portion (and therefore the steering subsystem) move along the rack portion. Such an arrangement reduces required footprint of vehicle steering system 10 as the motive members are steered throughout their full range of movement by maintaining the rack portion in a fixed position. The reduced footprint allows vehicle steering system 10 to remain substantially within the periphery of the framework of the vehicle (e.g., the side walls of a V-hull vehicle, etc.).

Before discussing the details of vehicle steering system 10, it should be noted at the outset that references to "front," "back," "rear," "upper," "lower," "top," "bottom," "right," and "left" in this description are merely used to identify the various elements as they are oriented in the FIGURES, with "front," "back," and "rear" being relative to the direction of travel of the vehicle and "right" and "left" being relative to the perspective of the driver. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 2:
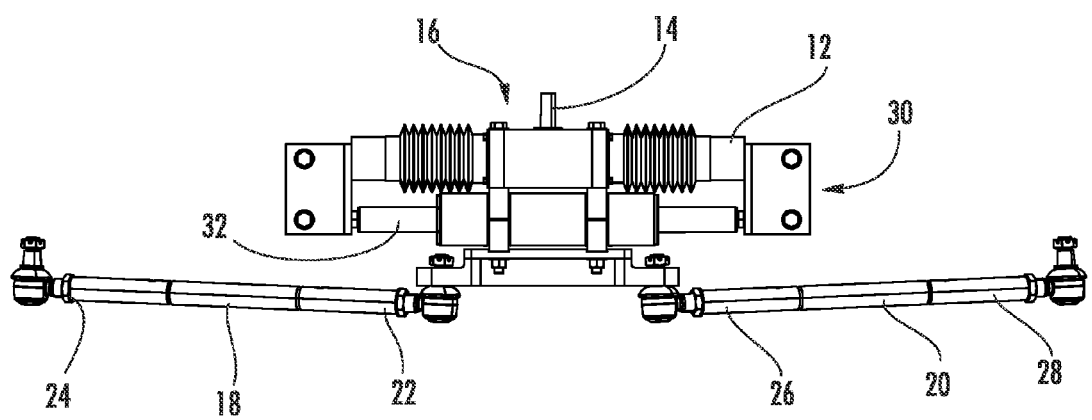
FIG. 2 is a front plan view of the vehicle steering system shown in FIG. 1.

Referring to FIGS. 1 and 2 in particular, vehicle steering system 10 generally includes an elongated member 12 that supports a gear rack (shown in FIG. 4), a pinion 14 having a gear portion (shown in FIGS. 3 and 4) configured to be in meshing engagement with gear rack, a steering subsystem 16 (e.g., base, follower, slide assembly, etc.) that rotatably supports pinion 14 and is moveable in a translational manner relative to member 12, a first steering shaft (e.g., arm, rod, member, etc.), shown as a first steering link 18 having a first end 22 and a second end 24, coupled to steering subsystem 16 and configured to be associated with a first motive member of the vehicle (e.g., a right motive member, etc.) and a second steering shaft (e.g., arm, rod, member, etc.), shown as a second steering link 20 having a first end 26 and a second end 28, coupled to steering subsystem 16 and configured to be associated with a second motive member of the vehicle (e.g., a left motive member, etc.).

Elongated member 12 remains in a substantially fixed position throughout the operation of vehicle steering system 10. To secure elongated member 12 in its substantially fixed position, vehicle steering system 10 further includes one or more mounting devices 30. With elongated member 12 secured, steering subsystem 16 moves in a translational manner along elongated member 12 upon the rotation of pinion 14 and the meshing engagement of the pinion gear portion and the gear rack.

Vehicle steering system 10 is further shown as including a device for assisting in the steering action of the one or more motive members of the vehicle. According to an exemplary embodiment, such a device comprises a hydraulic assist 32 that utilizes hydraulic fluid to assist in the steering action. Hydraulic assist 32 is a powered actuator (e.g., cylinder, etc.) having a least one piston. According to the embodiment illustrated, hydraulic assist 32 is a double-ended actuator having a pair of oppositely disposed pistons. Hydraulic assist 32 is supported at steering subsystem 16 and configured to extend substantially parallel to elongated member 12. According to the embodiment illustrated, hydraulic assist 32 is supported in substantially the same vertical plane as elongated member 12 and is positioned beneath elongated member 12. The ends of hydraulic assist 32 are coupled to the same mounting devices 30 used to secure elongated member 12 to the vehicle.

Figure 3:
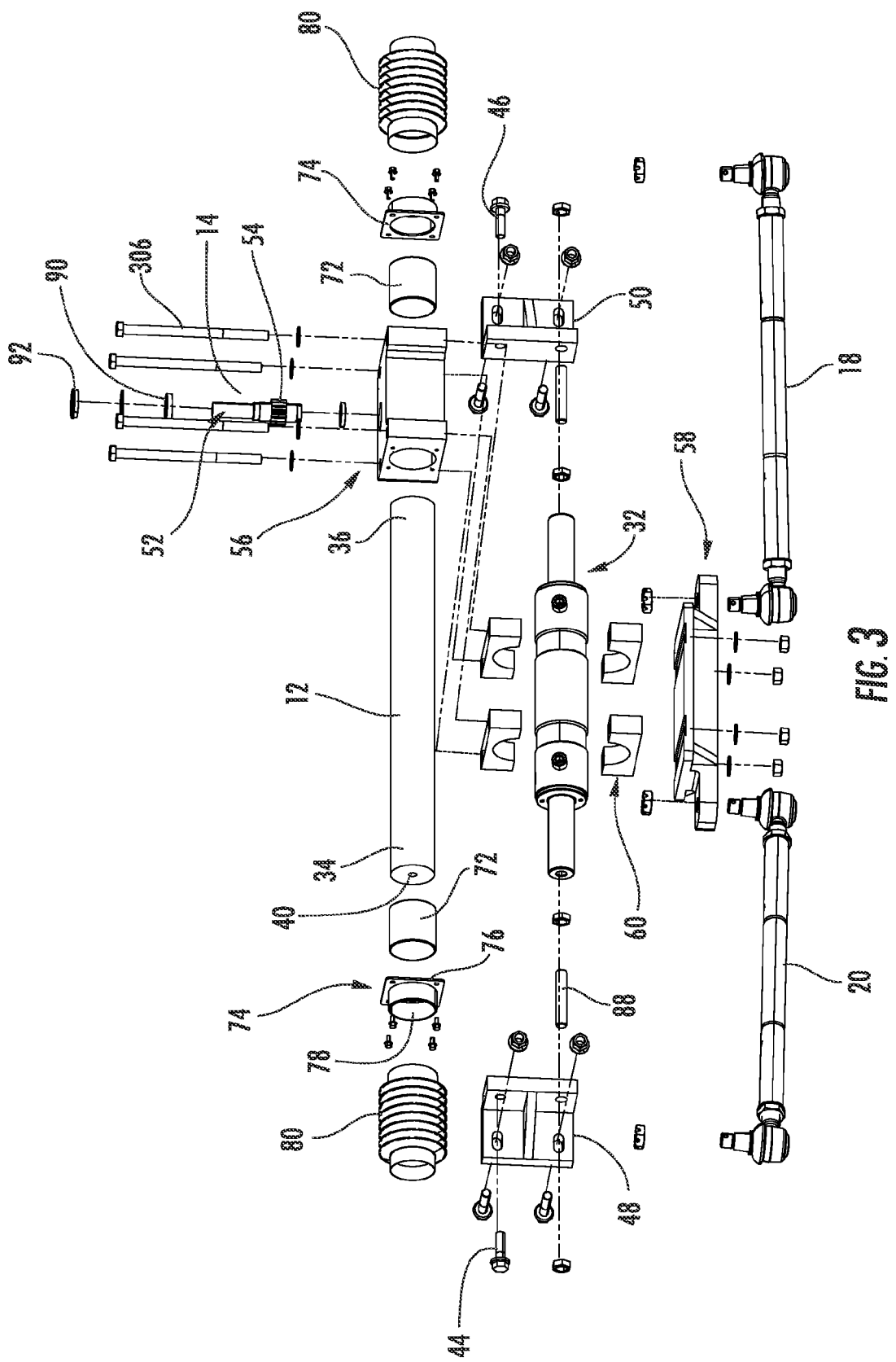
FIG. 3 is an exploded rear isometric view of the vehicle steering system shown in FIG. 1.
Figure 4:
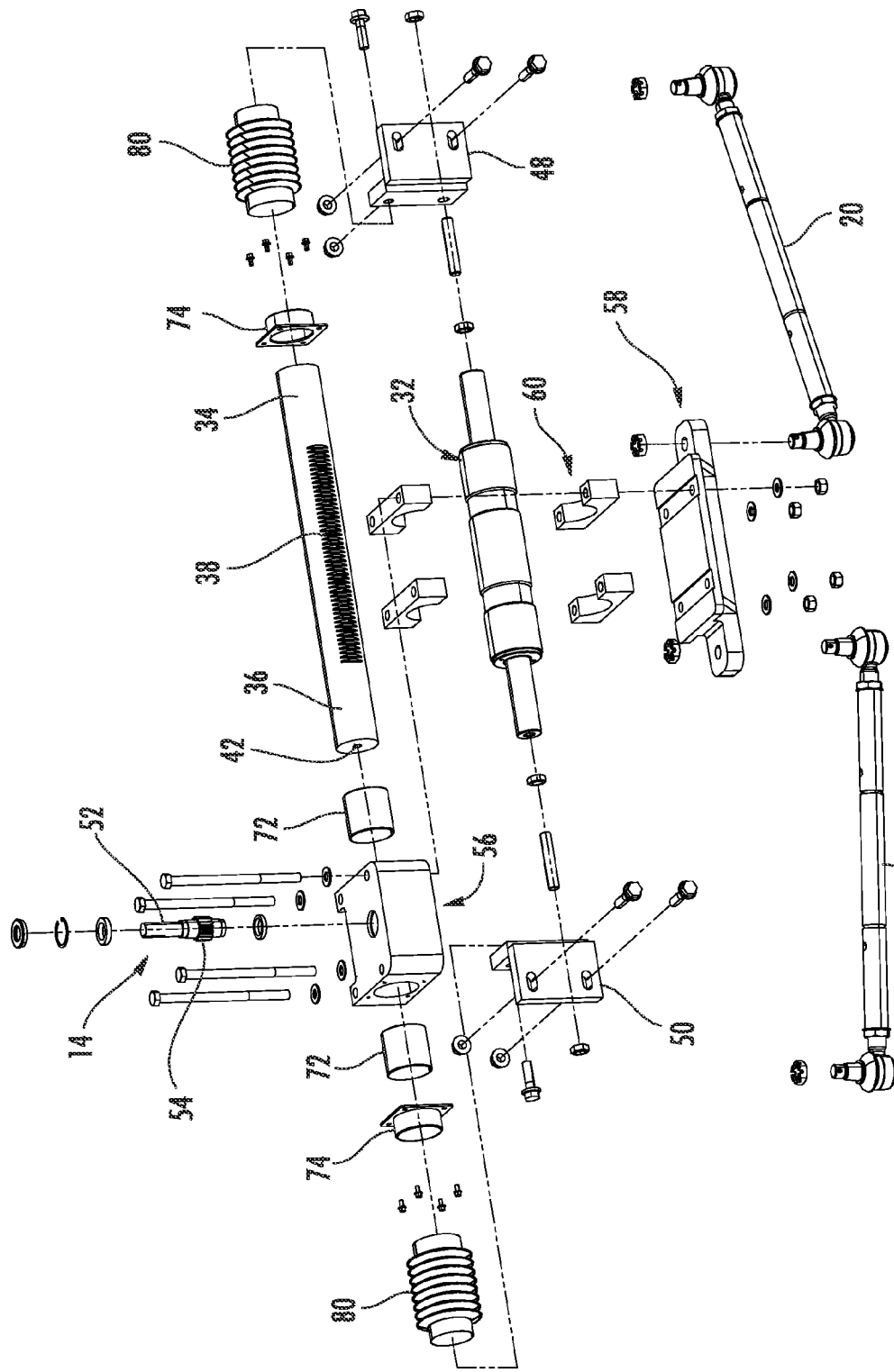
FIG. 4 is an exploded front isometric view of the vehicle steering system shown in FIG. 1.

Additional details of vehicle steering system 10 are provided below with reference to FIGS. 3 and 4. FIGS. 3 and 4 show exploded views of vehicle steering system 10. FIG. 3 shows an exploded view of vehicle steering system 10 from the rear, while FIG. 4 shows an exploded view of vehicle steering system 10 from the front.

Elongated member 12 is a rigid, generally cylindrical structure that extends between a first end 34 and a second end 36. According to the embodiment illustrated, elongated member 12 has a cross section that is generally circular in shape. According to various exemplary embodiments, the cross sectional shape of elongated member 12 may be any of a variety of shapes including, but not limited to, rectangular, octagonal, triangular, free-form, etc. Further, the cross sectional shape and size of elongated member 12 is substantially continuous between first end 34 and second end 36. According to various alterative embodiments, the cross sectional shape and/or size may vary along the length of elongated member 12. For example, elongated member 12 may have a different shape and/or size at its ends to provide a stop mechanism for steering subsystem 16.

Elongated member 12 is intended to support a linear gear, shown as rack member 38 in FIG. 4 having a plurality of rack teeth formed thereon. According to an exemplary embodiment, rack member 38 is integrally formed with elongated member 12 to provide a single unitary body. In such a configuration, the plurality of rack teeth are cut or otherwise formed into a portion (e.g., segment, section, etc.) of elongated member 12. According to the various alternative embodiments, rack member 38 may be a separate member that is coupled (e.g., bolted, press-fit, adhered or otherwise fastened) to elongated member 12. Rack member 38 is shown as being provided at only a front side of elongated member 12 and is formed intermediate axially opposite ends 34, 36 of elongated member 12. The number of rack teeth and the length of rack member 38 at least partially determine the length of travel of pinion 14 and steering subsystem 16 along elongated member 12.

As already indicated, elongated member 12 is configured to be fixedly secured relative to the framework of the vehicle in which it is installed. To facilitate the securement of elongated member 12, first end 34 and second end 36 include apertures (e.g., openings, channels, grooves, notches, etc.), shown as threaded holes 40, 42 respectively. Threaded holes 40, 42 are shown as being substantially aligned with a center axis of elongated member 12 and are configured to receive bolts 44, 46 or other suitable fasteners for securing elongated member 12 relative to the framework of the vehicle. Before engaging holes 40, 42, bolts 44, 46 first pass through mounting devices 30, shown as a first bracket 48 and a second bracket 50, which get mounted to the framework of the vehicle.

Figure 7:
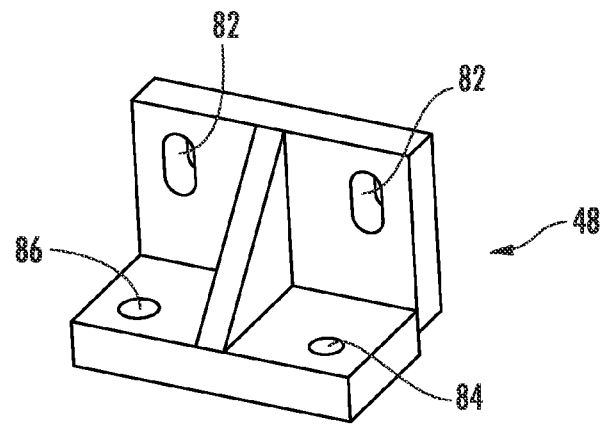
FIG. 7 is an isometric view of a support structure of the vehicle steering system of FIG. 1 according to an exemplary embodiment.

According to an exemplary embodiment, first and second brackets 48, 50 are substantially identical. Referring to FIG. 7, first bracket 48 is shown as a substantially L-shaped bracket with a structural rib extending between a first wall and a second wall of the bracket. The first wall of bracket 48 includes one or more apertures 82 configured to receive a bolt or other suitable fastener for securing bracket 48 to the framework of the vehicle. The second wall of bracket 48 include a first aperture 84 and a second aperture 86. First aperture 84 is configured to receive bolt 44 or other suitable fastener for securing elongated member 12 to bracket 48, while second aperture 86 is configured to receive a fastener 88 (shown in FIGS. 3 and 4) for securing hydraulic assist 32 to bracket 48. According to the various alternative embodiments, mounting devices 30 may be any of a variety of mechanisms or structures capable of securing elongated member 12 and/or the end of hydraulic assist 32 in a fixed manner relative to the framework of the vehicle.

Referring back to FIGS. 3 and 4, pinion 14 is configured to be operably coupled to a steering input to transfer a steering command from the steering input to rack member 38 of elongated member 12. According to an exemplary embodiment, pinion 14 includes a shaft portion 52 and a gear portion 54 (e.g., a circular gear, elliptical gear, etc.). Shaft portion 52 is an elongated, cylindrical member or axle that extends from gear portion 54. Shaft portion 52 may include a structure for operably coupling pinion 14 to the steering input. For example, shaft portion 52 may include a splined bore, a splined projection, a key or any other suitable structure for securing pinion 14 to the steering input. Gear portion 54 extends radially outward from shaft portion 52 and includes gear teeth that are configured to be in meshing engagement with the rack teeth of rack member 38.

Pinion 14 is supported for rotational movement about a substantially vertical axis by a portion of steering subsystem 16. According to an exemplary embodiment, steering subsystem 16 generally includes a housing 56, a steering link base 58 and a support structure 60. According to various alternative embodiments, steering subsystem 16 may take on any of a variety of different shapes, sizes and configurations depending on the application in which vehicle steering system 10 will be used. According to further alternative embodiments, steering subsystem 16 may be configured to receive one or more components, or may receive less than all of the components detailed herein. According to still further alternative embodiments, steering subsystem 16 may be integrally formed as a single unitary body, or it may be formed from more or less than the number of sections or pieces detailed above.

Figure 5A:
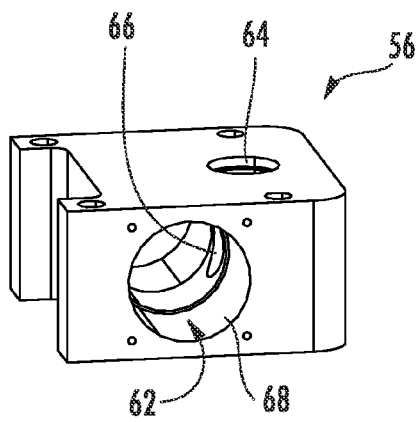
FIG. 5A is a top isometric view of a housing of the vehicle steering system of FIG. 1 according to an exemplary embodiment.
Figure 5B:
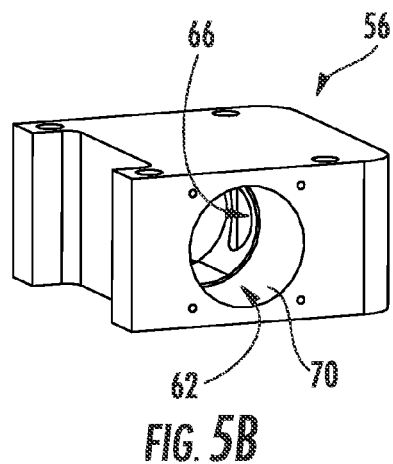
FIG. 5B is a bottom isometric view of the housing of FIG. 5A.

Housing 56 is a rigid structure within which elongated member 12 and pinion 14 are received and/or rotatably supported. Housing 56, like the rest of steering subsystem 16, is configured to move (e.g., slide, etc.) in a translational manner relative to elongated member 12 in response to a steering input command received by pinion 14. Referring to FIGS. 5A and 5B, housing 56 includes a first aperture (e.g., hole, opening, cavity, chamber, etc.), shown as a first bore 62, a second aperture (e.g., hole, opening, cavity, chamber, etc.), shown as a second bore 64, and third aperture (e.g., hole, opening, etc.), shown as an access window 66.

First bore 62 is a through hole provided in housing 56 that is configured to receive elongated member 12. According to an exemplary embodiment, the cross sectional shape and size of first bore 62 substantially corresponds to the cross sectional shape and size of elongated member 12 so that housing 56 can move in a slidable manner along elongated member 12 with limited clearance between first bore 62 and an outer periphery of elongated member 12. First bore 62 extends laterally through housing 56 between a first end 68 and a second end 70. According to the embodiment illustrated, first and second ends 68, 70 of first bore 62 are recessed or sized larger than a central portion of first bore 62 (e.g., first and second ends 68, 70 have a diameter that is slightly larger than the central portion, etc.) so that first and second ends 68, 70 can each receive a friction reducing device that will engage elongated member 12.

Referring back to FIGS. 3 and 4, the friction reducing devices, shown as bearings 72, are coupled to housing 56 at first and second ends 68, 70 of first bore 62 and have internal surfaces configured to directly engage the outer periphery of elongated member 12. According to an exemplary embodiment, bearings 72 may help to support the thrust and/or radial loads that may be experienced during the movement of steering subsystem 16 along elongated member 12. According to various alternative embodiments, the friction reducing devices may be any member or device suitable for allowing steering subsystem 16 to move along elongated member 12 (e.g., ball bearings, cylindrical roller bearings, needle bearings, linear bearings, bearing surfaces, etc.).

According to an exemplary embodiment, bearings 72 are press-fit into first and second ends 68, 70 of first bore 62. To ensure that bearings 72 remain fixed within housing 56 as steering subsystem 16 moves along elongated member 12, a pair of retaining members (e.g., couplings, seals, brackets, etc.), shown as end caps 74, are coupled to housing 56 at opposite ends of first bore 62. End caps 74 are shown as including flange portions 76 and sleeve portions 78. Flange portions 76 include a plurality of apertures which align with corresponding apertures in the lateral sides of housing 56 to receive bolts or any other suitable fasteners. Sleeve portions 78 outwardly extend from flange portions 76 in an axial direction and provide surfaces for attaching covers 80.

Covers 80 are provided to reduce the amount dirt or other contaminants that is exposed to elongated member 12 and more particularly to rack member 38. Covers 80 include first ends that are coupled to end caps 74 and second ends that are coupled to either first end 34 or second end 36 of elongated member 12. Covers 80 have bellows that are expandable and contractible upon movement of steering subsystem 16 relative to elongated member 12.

Referring again to FIG. 5A, second bore 64 is shown as being disposed in a top surface of housing 56 and extending downward at least partially therethrough. Second bore 64 is configured to receive and support pinion 14 so that gear portion 54 is in alignment with the teeth of rack member 38 and capable of rotating relative to housing 56. Referring back to FIGS. 3 and 4, second bore 64 is also configured to receive one or more friction reducing devices, shown as bearings 90, and/or a fastener 92. Bearings 90 provide for the relatively smooth rotation of pinion 14 relative to housing 56, while fastener 92 ensures that pinion 14 remains in its desired position throughout the operation of vehicle steering system 10.

Referring again to FIGS. 5A and 5B, access window 66 is an opening provided in housing 56 that is intended to provide communication between first bore 62 and second bore 64 so that gear portion 54 of pinion 14 can be in meshing engagement with rack member 38 of elongated member 12. According to an exemplary embodiment, access window 66 is a substantially rectangular or otherwise oblong opening through which gear portion 54 of pinion 14 at least partially extends. According to the embodiment illustrated, access window 66 is intended to face rearward relative to the vehicle. According to various alternative embodiments, access window 66 may have any one of a variety of different shapes and sizes, and may be provided in various locations on housing 56.

Figure 6:
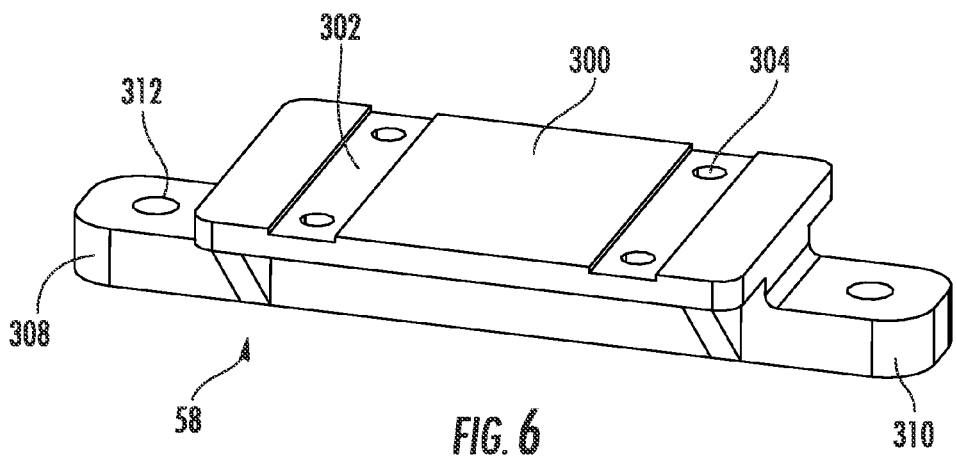
FIG. 6 is an isometric view of a steering link base of the vehicle steering system of FIG. 1 according to an exemplary embodiment.

Steering link base 58 is coupled to housing 56 and is configured to translate the linear movement of steering subsystem 16 to first steering link 18 and second steering link 20. Referring to FIG. 6, steering link base 58 is shown as a substantially rigid plate-like member having a first mounting portion for securing steering link base 58 relative to housing 56, a second mounting portion for receiving first steering link 18 and a third mounting portion for receiving second steering link 20. First mounting portion is shown as a substantially flat pad 300 or receiving structure that is configured to provide a surface or structure that is suitable to receive housing 56 or another portion of steering subsystem 16 (e.g., support structure 60, etc.). According to the embodiment illustrated, pad 300 includes a pair of recessed channels 302 (e.g., grooves, slots, etc.) extending substantially perpendicular to elongated member 12 that are configured to receive support structure 60 (detailed below). To facilitate the coupling of support structure 60 to steering link base 58, pad 300 includes a series of spaced apertures 304 provided within channels 302. Housing 56 and support structure 60 include corresponding apertures configured to be in alignment with apertures 304. Bolts 306 (shown in FIGS. 3 and 4) or other suitable fasteners extend through apertures 304 and the corresponding apertures of housing 56 and support structure 60 to secure the components of steering subsystem 16 together. According to various alternative embodiments, pad 300 may assume a variety of different configurations depending on the application.

Second and third mounting portions of steering link base 58 are shown as wings 308, 310 (e.g., extensions, etc.) respectively which outwardly extend from opposite lateral sides of pad 300. Wing 308 is configured to support a first end 22 of steering link 18, while wing 310 is configured to support a first end 26 of steering link 20. According to an exemplary embodiment, wings 308, 310 include apertures 312 configured to receive a rotatable joint provided at first ends of steering links 18, 20 respectively.

Referring back to FIGS. 3 and 4, support structure 60 is configured to secure hydraulic assist 32 to steering subsystem 16. According to the embodiment illustrated, support structure 60 includes corresponding pairs of retaining members that are configured to sandwich hydraulic assist 32 therebetween for securing it to steering subsystem 16. The retaining members are shown as having inner surfaces corresponding to the shape and size of hydraulic assist 32 (e.g., circular, semi-circular, etc.). Further, hydraulic assist 32 is shown as having a pair of channels for which the retaining members are configured to engage. The addition of channels may assist in securing hydraulic assist 32 in a lateral direction. According to various alternative embodiments, support structure 60 may take on any of a variety of different shapes, sizes and configurations depending the type of steering assist device being used.

Figure 8:
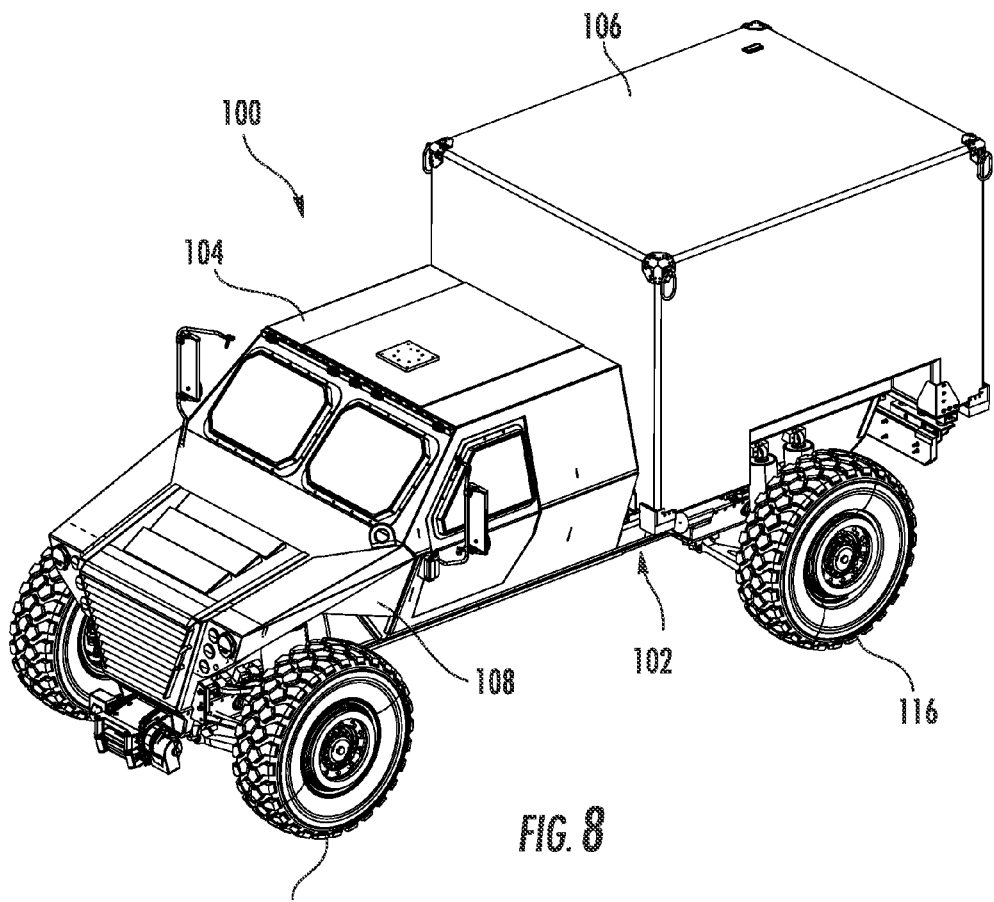
FIG. 8 is an isometric view of a vehicle according to an exemplary embodiment that includes the vehicle steering system shown in FIG. 1.
Figure 9:
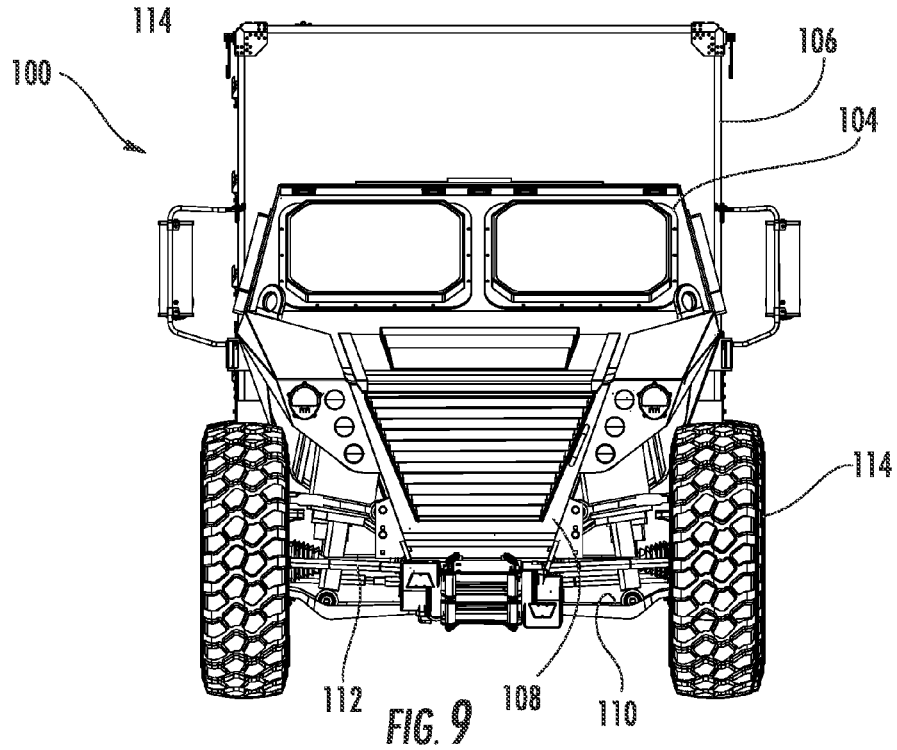
FIG. 9 is a front plan view of the vehicle shown in FIG. 8.

FIGS. 8 and 9 illustrate a vehicle 100 for which vehicle steering system 10 may be particularly applicable. Vehicle 100 is a self-propelled vehicle that, according to the embodiment illustrated, comprises a military or paramilitary vehicle that is likely to be used in potentially hazardous environments or conditions. In addition to vehicle steering system 10, vehicle 100 generally includes a chassis 102, a cab 104 and a rear body 106. Chassis 102 generally includes the functional parts of vehicle 100 such as a frame (e.g., framework, base, etc.), shown as a hull 108, a suspension 110, an exhaust system (not shown), brakes (not shown), a drive system (not shown), a front axle 112, a rear axle (not shown), a drive train (not shown), a fuel system (not shown), front motive members 114 and rear motive members 116. Cab 104 is supported at a front portion of hull 108 and functions as an occupant compartment for vehicle 100. Body 106 generally comprises one or more structures, including panels, supported at a rear portion of hull 108 and configured to form a cargo area.

The drive system of vehicle 100 may be capable of providing the power to operate vehicle 100 and certain components of vehicle 100 as well as the structure for transmitting the power to one or more motive members 114, 116. The drive system generally comprises a power source or prime mover and a motion transfer device. The prime mover generally comprises a source of mechanical energy (e.g., rotational movement, etc.) which is derived from an energy source (e.g., a stored energy source, etc.). Examples of suitable prime movers include, but are not limited to, an internal combustion gas-powered engine, a diesel engine, a turbine, a fuel cell driven motor, an electric motor or any other type of motor capable of providing mechanical energy. Any of the just-mentioned prime movers may be used alone or in combination with one or more additional power sources (as in a hybrid vehicle) to provide mechanical energy.

The motion transfer device (e.g., a transmission) is coupled to an output of the prime mover and ultimately (in combination with other components) transfers the power and rotational mechanical energy received from the prime mover to one or more motive members 114, 116, which in turn propel vehicle 100 in a forward or rearward (or other) direction. The motion transfer device may be coupled, directly or indirectly, to one or more motive members 114, 116, a wheel end reduction unit, and/or a series of motion transferring devices such as shafts, joints, differentials, etc. that are coupled together to transfer the power or energy provided by the prime mover to one or more motive members 114, 116.

Front motive member 114 and rear motive members 116 generally comprise ground motive members configured to propel or move vehicle 100. According to an exemplary embodiment, front motive members 114 and rear motive members 116 comprise wheels coupled to axles. According to various alternative embodiments, front and rear motive members 114, 116 may comprise other known or otherwise suitable members configured for engaging a ground, track or other surface so as to propel or suspend vehicle 100. For example, front and/or rear motive members 114, 116 may comprise movable tracks such as commonly employed on tanks and some tractors. Although front and rear motive members 114, 116 are illustrated as being similar to one another, front motive members 114 may alternatively be differently configured than rear motive members 116. For example, front motive members 114 may comprise wheels while rear motive members 116 comprise tracks.

Figure 10:
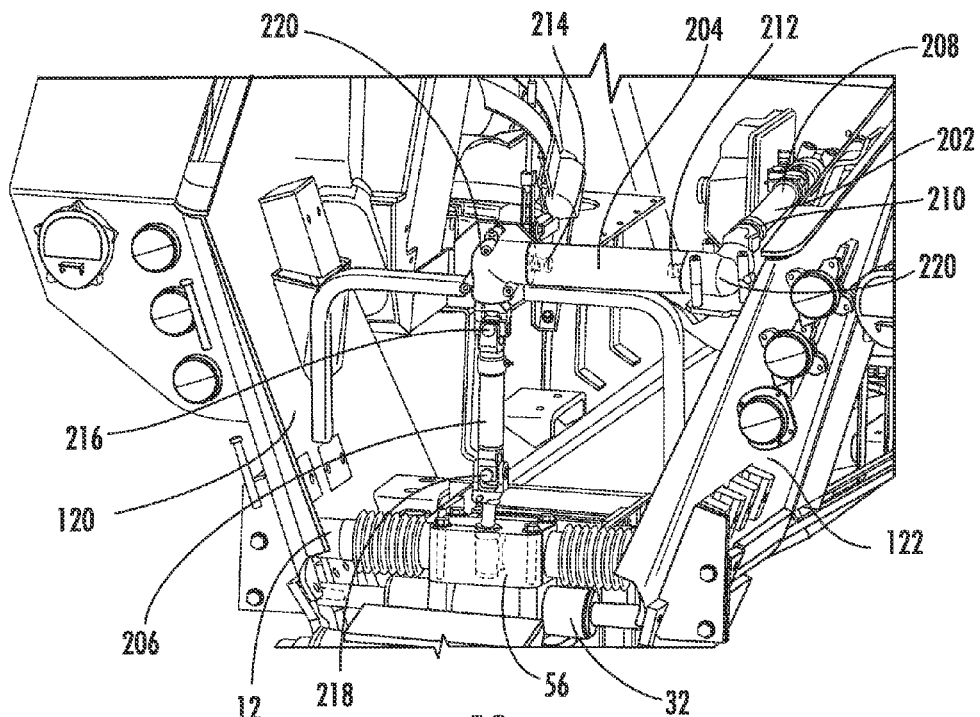
FIG. 10 is a partial isometric view of the vehicle shown in FIGS. 8 and 9 illustrating the vehicle steering system.
Figure 11:
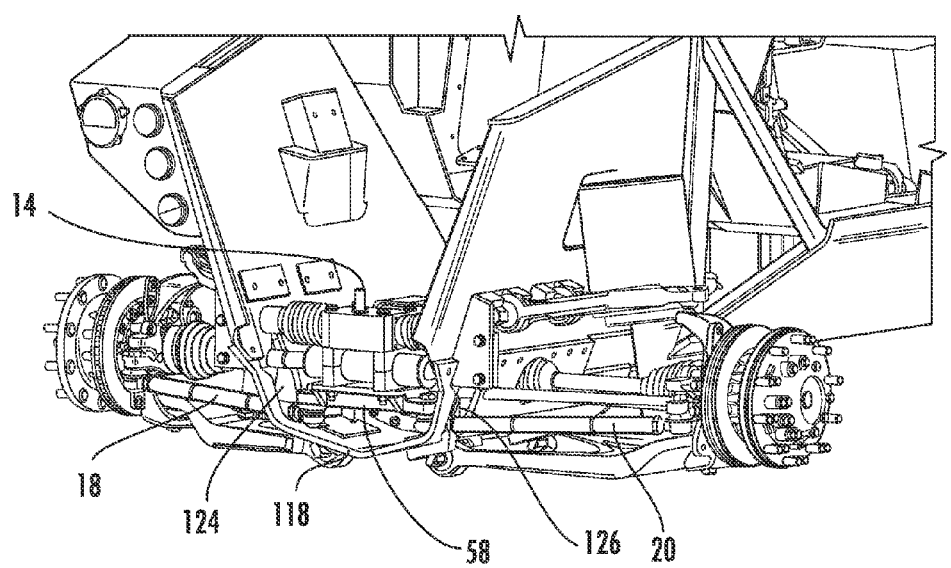
FIG. 11 is another partial isometric view of the vehicle shown in FIGS. 8 and 9 illustrating the vehicle steering system.
Figure 12:
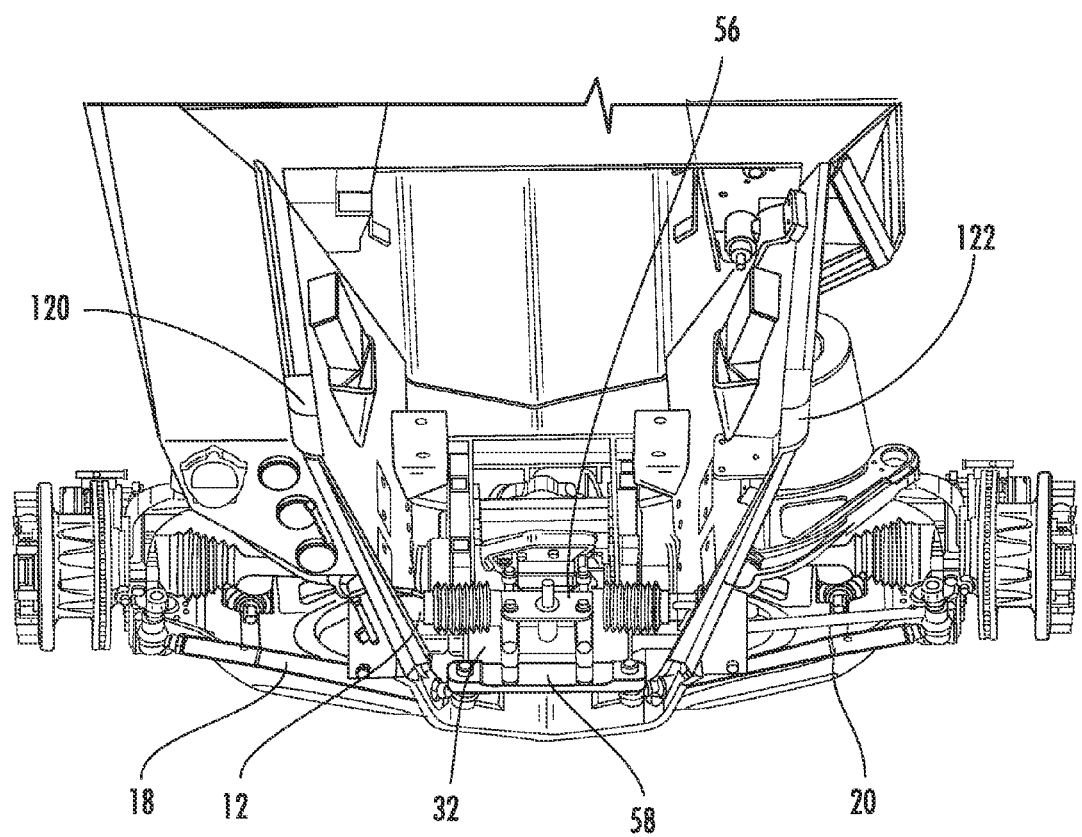
FIG. 12 is a partial top view of the vehicle shown in FIGS. 8 and 9 illustrating the vehicle steering system.

Referring to FIGS. 10 through 12, vehicle steering system 10 is shown within vehicle 100. According to the embodiment illustrated, vehicle steering system 10 is shown as a front steering system configured to control the movement of front motive members 114. According to various alternative embodiments, vehicle steering system 10 may be a rear steering system configured to control the movement of rear motive members 116. Vehicle steering system 10 is generally positioned at a bottom portion 118 of hull 108 between a first side wall 120 and a second side wall 122 of hull 108. While positioned at bottom portion 118, vehicle steering system 10 is sufficiently offset from bottom portion 118 so that hull 108 does not interfere with the translational movement of steering subsystem 16. First side wall 120 and second side wall 122 each include an aperture (e.g., window, orifice, etc.), shown as openings 124, 126 respectively for allowing mechanical communication between vehicle steering system 10 and front motive members 114. The size of openings 124, 126 is preferably minimized to protect vehicle steering system 10 and/or other components of vehicle 100 supported within a front portion of hull 108.

According to an exemplary embodiment, first side wall 120 and second side wall 122 of hull 108 are aligned upward and outward from a center line of vehicle 100. According to the embodiment illustrated, first side wall 120 and second side wall 122 cooperate to define a substantially V-shaped hull 108. According to various alternative embodiments, hull 108 may take on any of a variety of configurations depending on the application.

As indicated above, and as further detailed below, vehicle steering system 10 is configured to remain substantially within hull 108 while steering front motive members 114 through their full range of movement. In particular, elongated member 12 is fixed to inside surfaces of side walls 120, 122 of hull 108 via brackets 48, 50 and does not extend beyond the periphery of hull 108 in at least a lateral direction. Further, while steering subsystem 16 moves laterally relative to elongated member 12 in a translational manner, steering subsystem 16 remains within the periphery of hull 108 during such movement.

Vehicle 100 includes a steering input device that is configured to generate steering commands which are transmitted to vehicle steering system 10 for steering front motive members 114. According to an exemplary embodiment, the steering input device includes one or more movable members which move in response to an input to generate a steering force which is transmitted along a steering force transmission route to vehicle steering system 10. The direction of the force resulting in movement of one of more shafts defining the steering force transmission route generally corresponds to the direction in which front motive members 114 are to be turned. The distance or angle by which the one or more shafts defining the steering force transmission route are moved generally corresponds to the desired angular displacement of front motive members 114. According to an exemplary embodiment, steering input device includes a steering wheel (not shown) which rotates upon receiving torque from an occupant (e.g., driver, etc.) of vehicle 100. The torque is transmitted along the steering force transmission route to vehicle steering system 10.

Referring to FIG. 10 in particular, and according to the embodiment illustrated, the force transmission route includes a first mechanical link 202, a second mechanical link 204 and a third mechanical link 206. First mechanical link 202 is shown as extending substantially in a fore and aft direction of vehicle 100 adjacent to second side wall 122 of hull 108. First mechanical link 202 has a first end 208 that is operably coupled to the steering input device and a second end 210 that is operably coupled to second mechanical link 204. Second mechanical link 204 is shown as extending in a substantially lateral direction, perpendicular to first mechanical link 202 within a horizontal plane, towards a centerline of vehicle 100. Second mechanical link 204 has a first end 212 that is operably coupled to first mechanical link 202 and a second end 214 that is operably coupled to third mechanical link 206. Third mechanical link 206 is shown as extending downward in a substantially vertical directional, perpendicular to second link 204 within a vertical plane. Third mechanical link 206 has a first end 216 operably coupled to second mechanical link 204 and a second end 218 operably coupled to pinion 14 of vehicle steering system 10. While third mechanical link 206 is shown in a substantially vertical position in FIG. 10, suitable joints are provided at first end 216 and second end 218 to allow at least second end 218 to move in a lateral direction as pinion 14 and steering subsystem 16 move relative to elongated member 12 in response to a steering input command.

To facilitate the transfer of rotational movement between first mechanical link 202, second mechanical link 204 and third mechanical link 206, mechanical gearboxes 220 are provided between second end 210 of first mechanical link 202 and first end 212 of second mechanical link 204 and between second end 214 of second mechanical link 204 and first end 216 of third mechanical link 206. The force transmission route may additionally include one or more force augmenting devices such as a hydraulic assist. The force transmission route may additionally include one or more ratio adjusting devices configured to augment or decrement the movement or motion being transmitted along the route. According to various alternative embodiments, the force transmission route may include hydraulic lines for transmitting force between the steering input device and vehicle steering system 10. According to further alternative embodiments, the force transmission route may be omitted in favor of an electronic control system which transmits steering commands in the form of electronic signals from the steering input device to vehicle steering system.

In lieu of including a steering wheel, the input steering device may alternatively include other means for inputting force for generating steering commands such as linearly movable input devices of the type commonly employed on skid steering vehicles. According to further alternative embodiments, the input steering input device may include an electronic control system which, in response to electronically generated steering command or steering commands generated by the driver manually entering steering information such as by depressing buttons or the like, moves one or more movable members to transmit the steering command by force to vehicle steering system 10.

Figure 13:
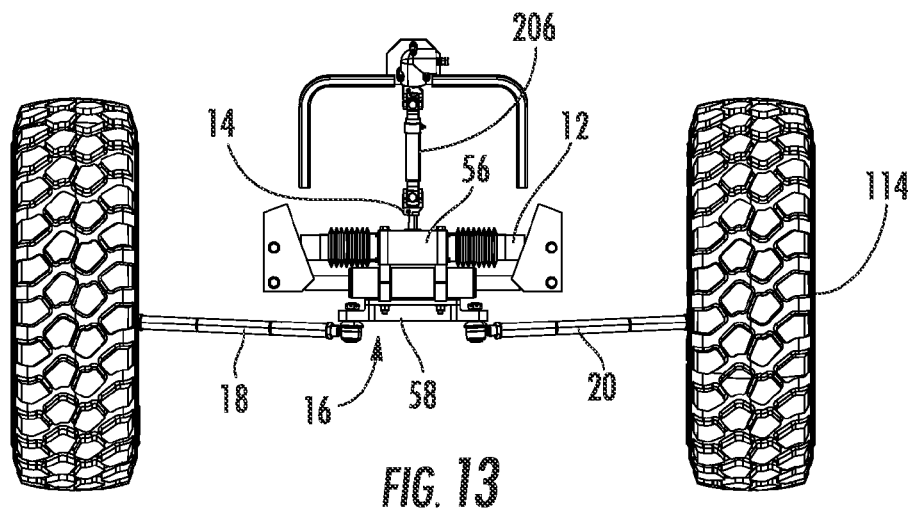
FIG. 13 is a front plan view of the vehicle steering system of FIG. 1 illustrating the vehicle wheels in a neutral position.
Figure 14:
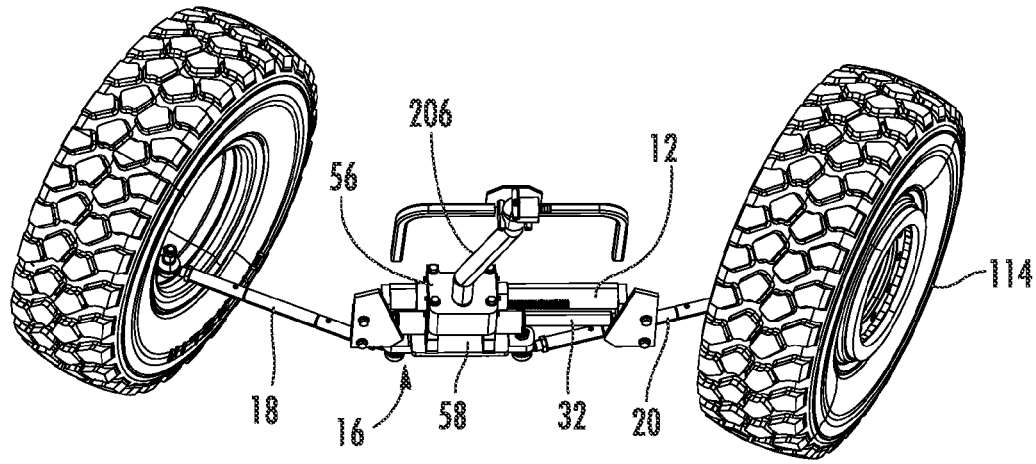
FIG. 14 is a top view of the vehicle steering system of FIG. 1 illustrating the vehicle wheels moved to a first position.
Figure 15:
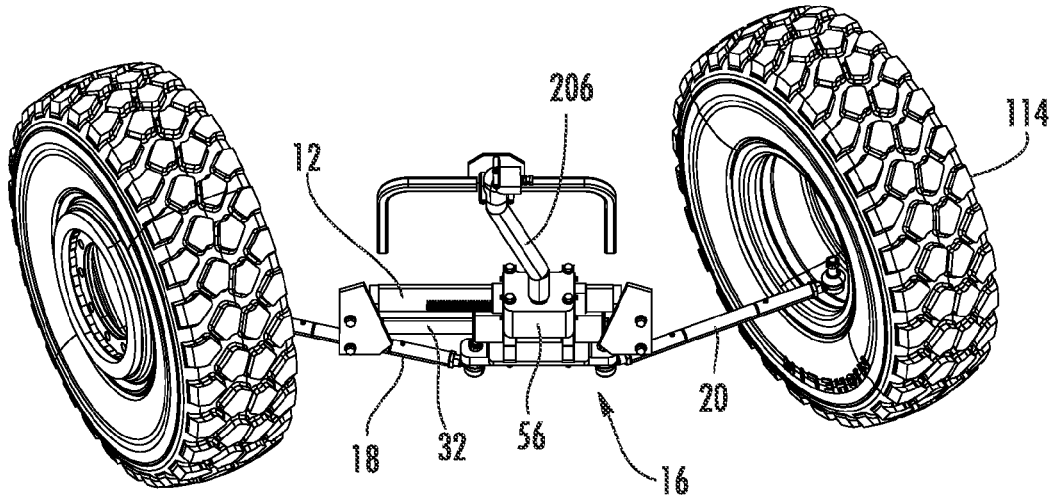
FIG. 15 is a top view of the vehicle steering system of FIG. 1 illustrating the vehicle wheels moved to a second position.

Referring to FIGS. 13 through 15, the operation of vehicle steering system 10 will be discussed in more detail. Referring to FIG. 13 in particular, vehicle steering system 10 is shown in a neutral or central position. In such a position, front motive members 114 are aligned such that vehicle 100 will move in a substantially straight line when front motive members 114 are rotated. In the neutral position, all of the components of vehicle steering system 10 are retained with a periphery of the vehicle framework with the exception of first and second steering links 18, 20 which directly transfer the steering input to front motive members 114. Further, in the neutral position, steering subsystem 16 is equally spaced between first end 34 and second end 36 of elongated member 12.

Referring to FIG. 14 in particular, vehicle steering system 10 is shown in a first or right-hand turn position. In such a position, front motive members 114 are aligned such that vehicle 100 will turn to the right when front motive members 114 are rotated. In the right-hand turn position, all of the components of vehicle steering system 10 remain within the periphery of the vehicle framework with the exception of first and second steering links 18, 20 which directly transfer the steering input to front motive members 114. Specifically, elongated member 12 remains fixed, and steering subsystem 16 (upon receiving an input steering command via pinion 14) moves (e.g., slides, etc.) towards the right relative to elongated member 12. Movement of steering subsystem 16 thereby moves first and second steering links 18, 20 to the right since they are directly coupled to steering link base 58. Further, in the right-hand turn position, steering subsystem 16 is provided at second end 36 of elongated member 12.

Referring to FIG. 15 in particular, vehicle steering system 10 is shown in a second or left-hand turn position. In such a position, front motive members 114 are aligned such that vehicle 100 will turn to the left when front motive members 114 are rotated. In the left-hand turn position, all of the components of vehicle steering system 10 remain within the periphery of the vehicle framework with the exception of first and second steering links 18, 20 which directly transfer the steering input to front motive members 114. Specifically, elongated member 12 remains fixed, and steering subsystem 16 (upon receiving an input steering command via pinion 14) moves (e.g., slides, etc.) towards the left relative to elongated member 12. Movement of steering subsystem 16 thereby moves first and second steering links 18, 20 to the left since they are directly coupled to steering link base 58. Further, in the left-hand turn position, steering subsystem 16 is provided at first end 34 of elongated member 12.

The construction and arrangement of the elements of the vehicle steering system and the vehicle as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the vehicle steering system may be constructed from any of a wide variety of materials that provide sufficient strength or durability in any of a wide variety of colors, combinations and suitable materials. Other substitutions, modifications, changes and omissions may be made in the design, operating conditions and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed herein.

What is claimed is:

1. A vehicle steering system comprising:
    a gear rack configured to remain in a fixed position relative to a vehicle chassis;
    a pinion gear in meshing engagement with the gear rack;
    a steering subsystem supporting the pinion gear and moveable in a translational manner relative to the gear rack; and
    at least one steering arm coupled to the steering subsystem and configured to steer a motive member in response to movement of the steering subsystem.

2. The vehicle steering system of claim 1, wherein the steering subsystem includes a housing and a steering arm base.

3. The vehicle steering system of claim 2, wherein the steering arm base is fixedly coupled to the housing and includes a mounting structure for receiving an end of the at least one steering arm.

4. The vehicle steering system of claim 1, further comprising a steering assist device extending in a direction that is substantially parallel with the gear rack.

5. The vehicle steering system of claim 4, wherein the steering assist device is supported substantially beneath the gear rack.

6. The vehicle steering system of claim 4, wherein the steering assist device is supported by the steering subsystem.

7. The vehicle steering system of claim 4, wherein the steering assist device is a double-ended hydraulic assist cylinder.

8. The vehicle steering system of claim 1, wherein the vehicle steering system is a front steering system configured to be coupled to front motive members to steer the front motive members based upon actuation of a steering input device.

9. A vehicle steering system comprising:
    a gear rack supported in a fixed position;
    a pinion gear in meshing engagement with the gear rack;
    a steering subsystem supporting the pinion gear and moveable in a translational manner relative to the gear rack, the steering subsystem including a housing and a steering arm base; and
    at least one steering arm coupled to the steering subsystem and configured to steer a motive member in response to movement of the steering subsystem,
    wherein the housing includes a first aperture configured to receive the pinion gear.

10. The vehicle steering system of claim 9, wherein the housing includes a second aperture configured to receive the gear rack, the second aperture being substantially perpendicular to the first aperture.

11. The vehicle steering system of claim 10, wherein the housing includes a friction reducing device configured to directly engage the gear rack.

12. The vehicle steering system of claim 11, wherein the friction reducing device includes at least one bearing pressed into the second aperture.

13. The vehicle steering system of claim 10, wherein the housing further includes a third aperture allowing communication between the first aperture and the second aperture so that the pinion gear can engage the gear rack.

14. A vehicle comprising:
    a chassis including at least one motive member and a hull, the hull including a first side wall and a second side wall;
    a vehicle steering system, for steering the motive member, comprising:
        a steering subsystem including a housing;
        a member received by the housing, the member supporting a gear rack having a plurality of teeth, the member and the gear rack being secured in a fixed position relative to the chassis between the first and second side walls; and a pinion supported by the housing and having a gear portion in meshing engagement with the plurality of teeth of the gear rack;

wherein the steering subsystem moves in a translatable manner relative to the member upon rotation of the pinion.

15. The vehicle of claim 14, wherein the steering subsystem further comprises a steering link base coupled to the housing, and the vehicle steering system further comprises at least one steering arm coupled to the steering subsystem, the steering arm transfers a steering input to the motive member.

16. The vehicle of claim 15, wherein the vehicle steering system further comprises a steering assist device supported by the steering subsystem so that the steering assist device is aligned substantially parallel with the member.

17. The vehicle of claim 16, further comprising a mounting device for securing ends of the member and ends of the steering assist device to the hull.

18. The vehicle of claim 14, wherein the vehicle steering system remains substantially within the first and second side walls while steering the motive member.

19. The vehicle of claim 14, wherein the first and second side walls are aligned to define a substantially V-shaped hull.

* * * * *